United States Patent
Fitzgerald

(10) Patent No.: US 6,421,720 B2
(45) Date of Patent: *Jul. 16, 2002

(54) CODEC-INDEPENDENT TECHNIQUE FOR MODULATING BANDWIDTH IN PACKET NETWORK

(75) Inventor: Cary W. Fitzgerald, Pleasanton, CA (US)

(73) Assignee: Cisco Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/181,947

(22) Filed: Oct. 28, 1998

(51) Int. Cl.[7] .................... G06F 15/173; G06F 15/16
(52) U.S. Cl. ............................... 709/224; 709/233
(58) Field of Search ............................ 709/223, 231, 709/232, 233, 224; 712/221; 370/401, 466

(56) References Cited

U.S. PATENT DOCUMENTS

| | | | |
|---|---|---|---|
| 4,731,816 A | | 3/1988 | Hughes-Hartogs ............ 379/98 |
| 4,769,815 A | * | 9/1988 | Hinch et al. ................... 370/94 |
| 4,771,391 A | * | 9/1988 | Blasbalg ....................... 709/232 |
| 5,115,429 A | * | 5/1992 | Hluchyj et al. ................ 370/84 |
| 5,231,633 A | * | 7/1993 | Hluchyj et al. ............. 370/94.1 |
| 5,506,844 A | * | 4/1996 | Rao ............................ 370/485 |
| 5,764,645 A | * | 6/1998 | Bernet et al. ................ 370/466 |
| 5,940,479 A | * | 8/1999 | Guy et al. ................. 379/93.01 |
| 6,002,669 A | * | 12/1999 | White ......................... 370/235 |
| 6,003,089 A | * | 12/1999 | Shaffer et al. ............... 709/223 |
| 6,005,871 A | * | 12/1999 | Petersen et al. ............. 370/474 |
| 6,006,253 A | * | 12/1999 | Kumar et al. ............... 709/204 |
| 6,052,368 A | * | 4/2000 | Aybay ........................ 370/357 |

FOREIGN PATENT DOCUMENTS

| EP | 942560 | * | 9/1999 | ........... H04L/12/64 |

OTHER PUBLICATIONS

Lettieri et al., "Adaptive Frame Length Control for Improving Wireless Link:", 1998, IEEE, pp. 564–571.*

Hashimoto, "End-to-End QoS Archetecture for Continous Media Services", 1998, IEEE, pp. 490–495.*

* cited by examiner

Primary Examiner—Robert B. Harrell
Assistant Examiner—Bunjob Jaroenchonwanit
(74) Attorney, Agent, or Firm—Marger Johnson & McCollom, PC

(57) ABSTRACT

The size of packet payloads are varied according to the amount of congestion in a packet network. More data is put in packet payloads when more congestion exits in the packet network. When network congestion is high, less network bandwidth is available for transmitting packets. Accordingly, the packet payloads are transmitted with larger payloads to reduce the percentage of overhead in each packet. When there is little or no network congestion smaller packet payloads are transmitted. The additional overhead created in transmitting smaller packets is acceptable when there is little or no network congestion because the network currently has excess bandwidth. Thus, the packet payloads are dynamically adjusted to use network resources more effectively.

26 Claims, 5 Drawing Sheets

CODEC-INDEPENDENT TECHNIQUE FOR MODULATING BANDWIDTH IN PACKET NETWORK

BACKGROUND OF THE INVENTION

This invention relates generally to packet networks and more particularly to a system for adapting packet payload size to the amount of network congestion.

A data stream is transmitted over a packet network by first formatting the data stream into multiple discrete packets. For example, in Voice Over Internet Protocol (VoIP) applications, a digitized audio stream is quantized into packets that are placed onto a packet network and routed to a packet telephony receiver. The receiver converts the packets back into a continuous digital audio stream that resembles the input audio stream. A codec (a compression/decompression algorithm) is used to reduce the communication bandwidth required for transmitting the audio packets over the network.

A large amount of network bandwidth is required for overhead when a data steam is converted and transmitted as packets. For example, in Realtime Transport Protocol (RTP)-encapsulated VoIP, a very common codec technique packetizes two 10 millisecond (ms) frames of speech into one audio packet. For a 8 kilobit per second (Kbit/s) coder, the 20 milliseconds of speech uses 20 bytes of the audio packet. There are an additional 40 bytes of the audio packet used for overhead, 20 bytes for an IP header, 8 bytes for an UDP header, and 12 bytes for a RTP header. The overhead to payload ratio is then 2 to 1, with two bytes of packet header for every one byte of audio packet payload.

When the packet network is congested, it is important to use network bandwidth efficiently. When there is too much congestion, a network processing node may drop some of the transmitted packets. Depending upon the speech encoding algorithm used in the audio encoder, the sound quality of the audio signal degenerates rapidly as more packets are discarded. The large overhead required for transmitting a data stream over the packet network substantially increases this network congestion causing more packets to be delayed or even dropped, in turn, reducing the quality of data transmitted over the packet network.

Accordingly, a need remains for a system that uses network bandwidth more effectively to improve transmission quality of data streams in a packet network.

SUMMARY OF THE INVENTION

The size of packet payloads are dynamically adapted to the amount of congestion in a packet network. More data is put in packet payloads when more congestion exists in the packet network. When network congestion is high, less network bandwidth is available for transmitting packets. Accordingly, the packets are transmitted with larger payloads. When there is little or no network congestion smaller packet payloads are transmitted. The additional overhead created in transmitting smaller packets is acceptable when there is little or no network congestion because the network has excess bandwidth. When the network is congested, this excess bandwidth no longer exists. Thus, more payload is loaded into each packet to reduce the overhead to payload ratio and, in turn, reduce bandwidth consumption. Thus, the packet payloads are dynamically adjusted to use network resources more effectively. Some users may be willing to trade off the delay inherent in packing more frames into a packet for increased efficiency.

Data is transmitted over the packet network by first encoding a data stream into encoded data. The encoded data is converted by a packetizer into packets having a packet header and a packet payload. The packetizer transmits the packets over the packet network to a receiving endpoint while monitoring congestion in the packet network.

In one embodiment of the invention, the data stream is an audio or video data stream generated by a telephone. The packetizer packetizes the encoded audio data into audio packets having a header and an audio payload. The size of the audio payload is increased by packing more audio frames into each audio packet. The size of audio payloads is then decreased when the packet network is no longer congested. Congestion is detected by measuring end-to-end delay between a transmitting gateway and a receiving gateway using an existing protocol such as RTCP.

The foregoing and other objects, features and advantages of the invention will become more readily apparent from the following detailed description of a preferred embodiment of the invention which proceeds with reference to the accompanying drawings.

DETAILED DESCRIPTION

Figure 1:
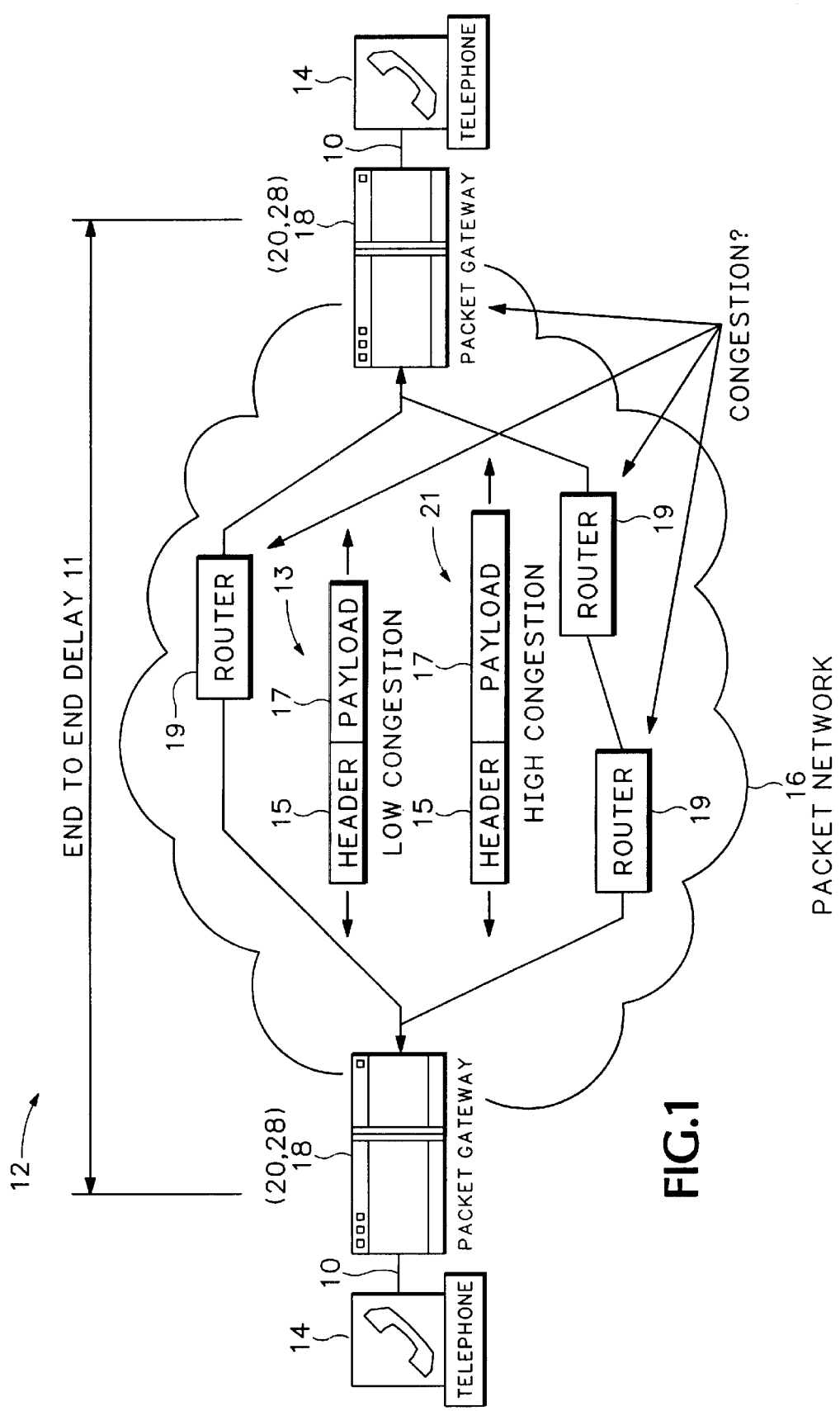
FIG. 1 is a schematic diagram of a packet telephony system that dynamically varies the size of audio packets according to network congestion.

FIG. 1 shows the general topology of a packet telephony system 12 that varies the size of packet payloads according to measured network congestion. It should be understood that the invention is applicable to any application where streaming or real-time data is packetized for transmission over a packet network. For example, the invention is equally applicable to video streams or multimedia data streams.

The packet telephony system 12 includes multiple telephone handsets 14 connected to a packet network 16 through gateways 18. The packet gateways 18 each include a codec for converting audio signals into audio packets and converting the audio packets back into audio signals. The handsets 14 are traditional telephones. Gateways 18 and the codecs used by the gateways 18 are any one of a wide variety of commercially available devices used for connecting the handsets 14 to the packet network 16. For example, the gateways 18 can be Voice Over Internet Protocol (VoIP) telephones or personal computers that include a digital signal processor (DSP) and software for encoding audio signals into audio packets.

The gateways 18 operate as a transmitting gateway when encoding audio signals into audio packets and transmitting the audio packets over the packet network 16 to a receiving gateway. The gateways 18 operate as the receiving gateway when receiving audio packets over the packet network 16 and decoding the audio packets back into audio signals.

Figure 2:
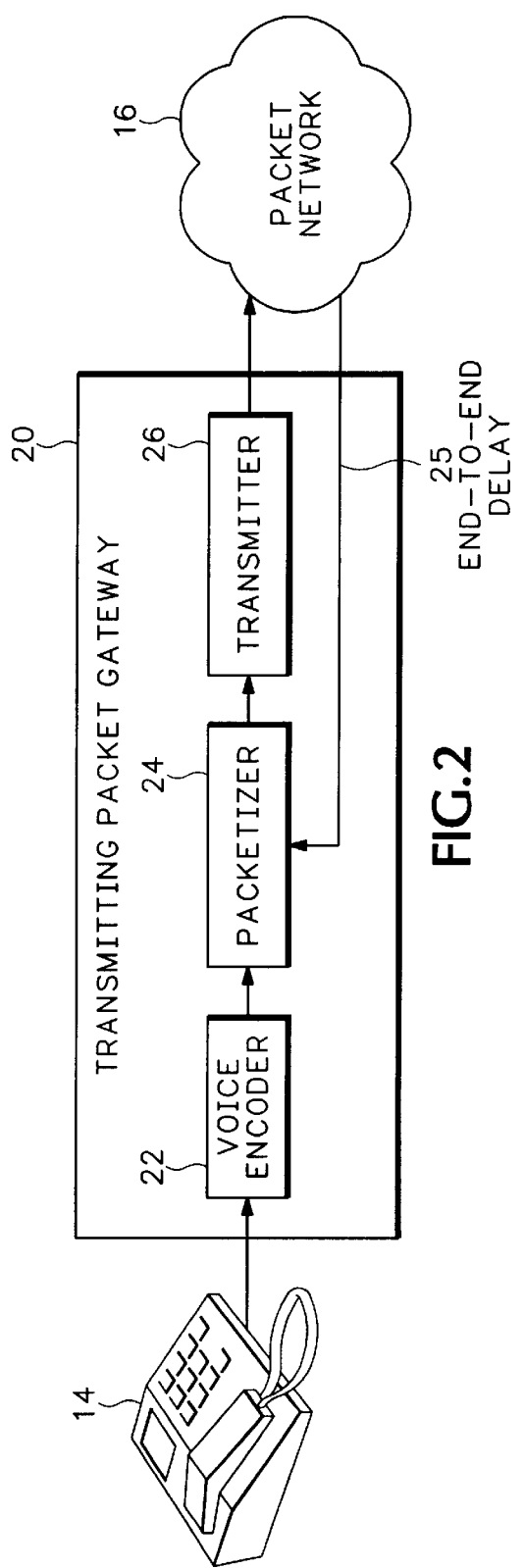
FIG. 2 is a schematic diagram of a transmitting gateway used in the packet telephony system shown in FIG. 1.

A gateway transmit path is shown in the transmitting packet gateway 20 in FIG. 2. The transmitting packet gateway 20 includes a voice encoder 22, a packetizer 24, and a transmitter 26. Voice encoder 22 implements the compression half of a codec. Packetizer 24 accepts compressed audio data from encoder 22 and formats the data into packets for transmission. The packetizer 24 receives an end-to-end delay signal 25 back from packet network 16. The end-to-end delay signal 25 is generated in various ways such as from a Real Time Protocol (RTP) report sent back from a receiving packet gateway 28 shown in FIG. 3. A transmitter 26 places the audio packets from packetizer 24 onto packet network 16.

Figure 3:
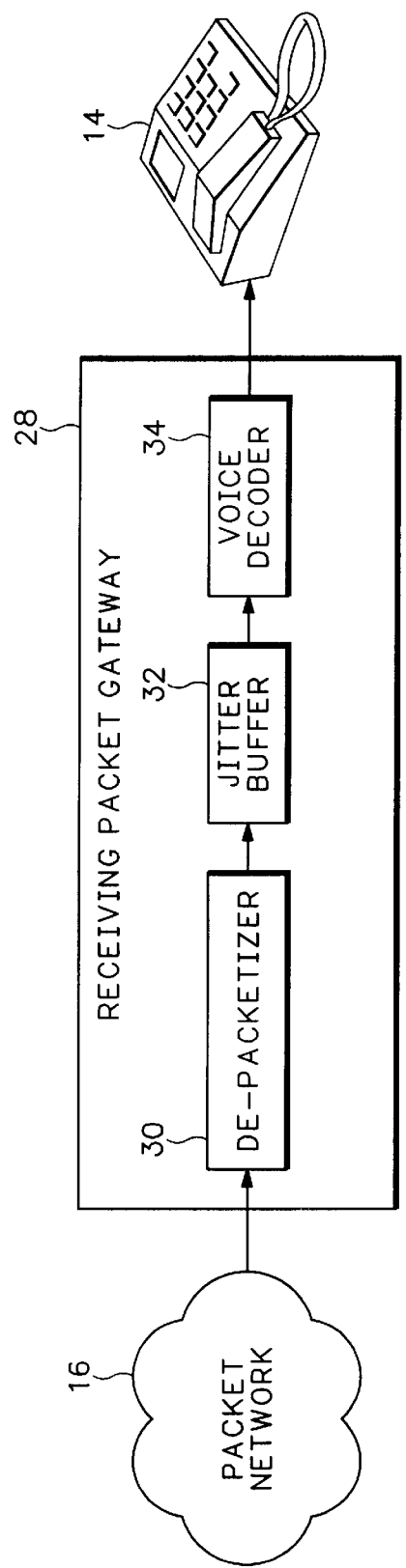
FIG. 3 is a schematic diagram of a receiving gateway used in the packet telephony system shown in FIG. 1.

The receiving packet gateway 28 is shown in FIG. 3. The receiving gateway 28 reverses the process in transmitting gateway 20. A depacketizer 30 accepts packets from packet network 18 and separates out the audio frames. A jitter buffer 32 buffers the audio frames and outputs them to a voice decoder 34 in an orderly manner. The voice decoder 34 implements the decompression half of the codec employed by voice encoder 22 (FIG. 2). The decoded audio frames are then output to telephone 14. The operations necessary to transmit and receive audio packets performed by the voice encoder 22, decoder 34, transmitter 26, packetizer 24 and depacketizer 30 are well known and, therefore, not described in further detail.

Referring back to FIG. 1, an end-to-end packet delay 11 is used to identify congestion occurring at any point in the packet network 16. Congestion is defined as heavy network utilization experienced by one or more network processing elements such as routers 19 and/or packet gateways 18. Congested network processing element(s) can "back-up", delaying processing and routing of packets 13 through the packet network 16. If the congestion is severe, packets may be discarded by one or more of the network processing elements.

To reduce congestion, the overhead to payload ratio between a packet header 15 and a packet payload 17 in the packet 13 is adapted to the current congestion conditions in packet network 16. When there is little or no congestion on the packet network 16, a smaller packet payload 17 is packed into each voice packet 13. The delay in transmitting the audio packet 13 is, in turn, shorter because the transmitting gateway 20 encodes and transmits a shorter portion of an audio stream 10 output from one of telephones 14.

When the packet network 16 is congested, the transmitting gateway 20 increases the amount of audio data (payload) 17 as shown in audio packet 21. The audio payload is dynamically increased while keeping header 15 the same size. Less network bandwidth is used to transmit the audio stream 10 because more audio data is transmitted using the same amount of packet overhead 15. This reduces congestion on the packet network 16 and reduces the likelihood of packets being dropped or further delayed.

Network congestion is inferred by the amount of time it takes the audio packets to travel between the transmitting gateway 20 and the receiving gateway 28. This end-to-end delay 11 is calculated using existing packet based voice protocols, such as Real Time Protocol (RTP RFC 1889) and Real Time Control Protocol (RTCP). RTP provides end-to-end transport for applications of streaming or real-time data, such as audio or video. RTCP provides estimates of network performance.

RTP and RTCP enable the receiving gateway to synchronize the received packets in the proper order so the user hears or sees the information correctly. Logical framing defines how the protocol "frames" or packages the audio or video data into bits (packets) for transport over a selected communications channel. Sequence numbering determines the order of data packets transported over a communications channel. RTCP also contains a system for determining end-to-end delay and periodically reporting that end-to-end delay back to the transmitting gateway 20. Any other dynamic measure of end-to-end delay or network congestion can similarly be used as an congestion identifier to packetizer 24.

Figure 4:
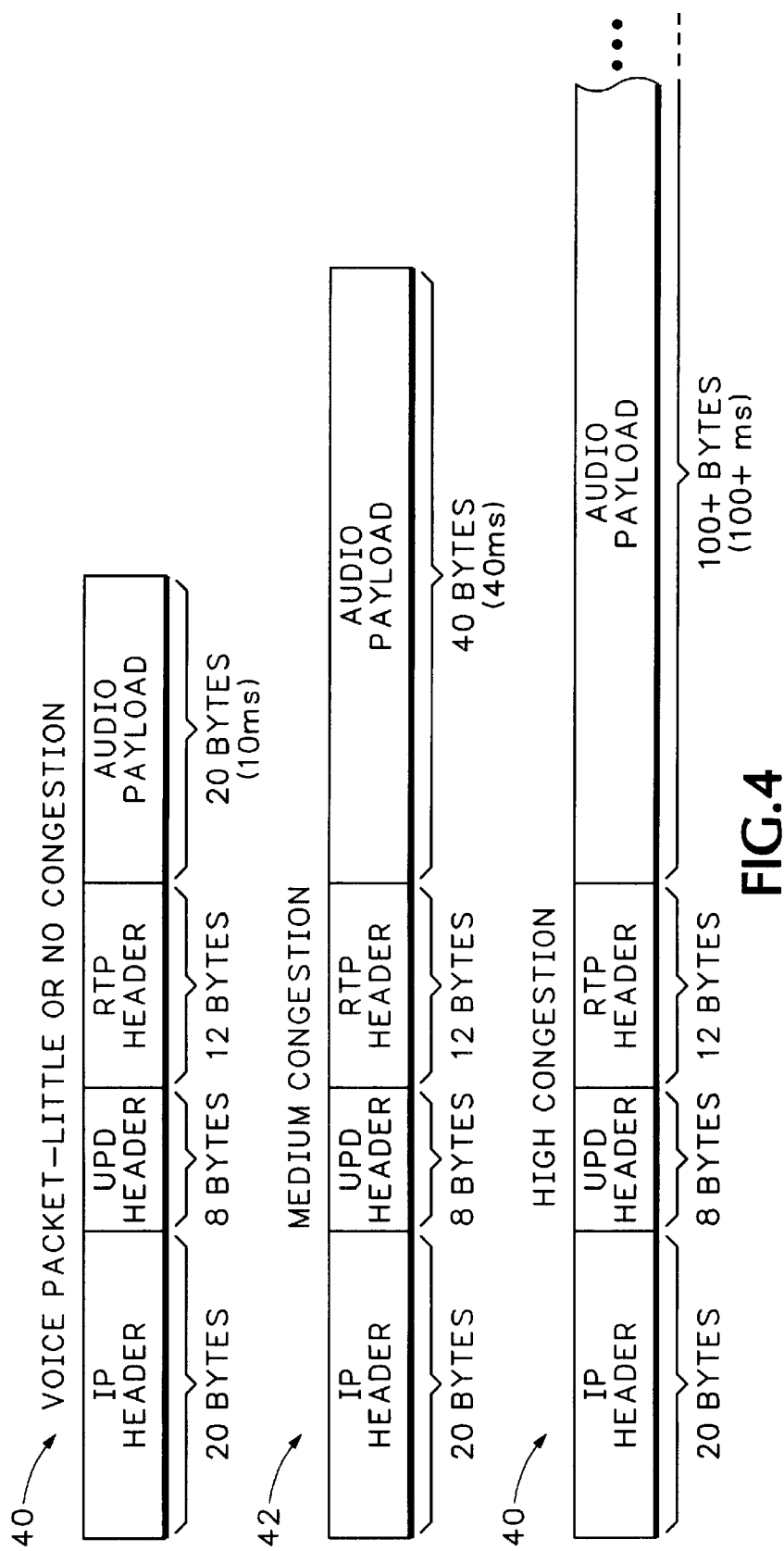
FIG. 4 is a schematic diagram of variable sized packet payloads transmitted by the transmitting gateway shown in FIG. 2.

Referring to FIG. 4, the network end-to-end 11 delay provided with the RTCP report is used by the packetizer 24 to automatically vary the number of audio frames placed in each packet payload. This amount of audio data typically varies from 10–20 ms up to some maximum such as 100 ms. However, smaller or larger audio payloads may be used depending on specific network conditions.

The audio packets 40, 42 and 44 are transmitted over the packet network 16 using an Internet Protocol (IP). The audio packets include an IP header that is 20 bytes long, a User Datagram Protocol (UDP) header that is 8 bytes long, an RTP header that is 12 bytes long, and a variable sized audio payload. With little or no network congestion, usually 20 ms of speech are packed into audio packet 40. The 20 ms of speech is encoded into approximately 20 bytes of packet payload. The 40 bytes of overhead including the IP header, UDP header, and RTP header in packet 40 takes up two thirds of audio packet 40. Every 20 ms. (50 times per second) a 60 byte packet 40 is then generated and transmitted by transmitting gateway 20 (FIG. 2).

When there is medium congestion in the packet network 16, audio packets similar to packet 42 are generated by the packetizer 24 (FIG. 2). The packet 42 carries 40 ms of audio data in a 40 byte packet payload but still uses only 40 bytes of overhead. The overhead ratio for transmitting 40 ms of speech is thereby reduced to one half of the total size of packet 42 at the cost of a 40 ms delay.

If heavy congestion is detected on the packet network 16, the packetizer 24 generates audio packets similar to packet 44. Packet 44 has a still larger audio payload of 100 ms. or more. The overhead ratio for transmitting 100 ms of speech is reduced further to one fifth of the total size of packet 44.

Figure 5:
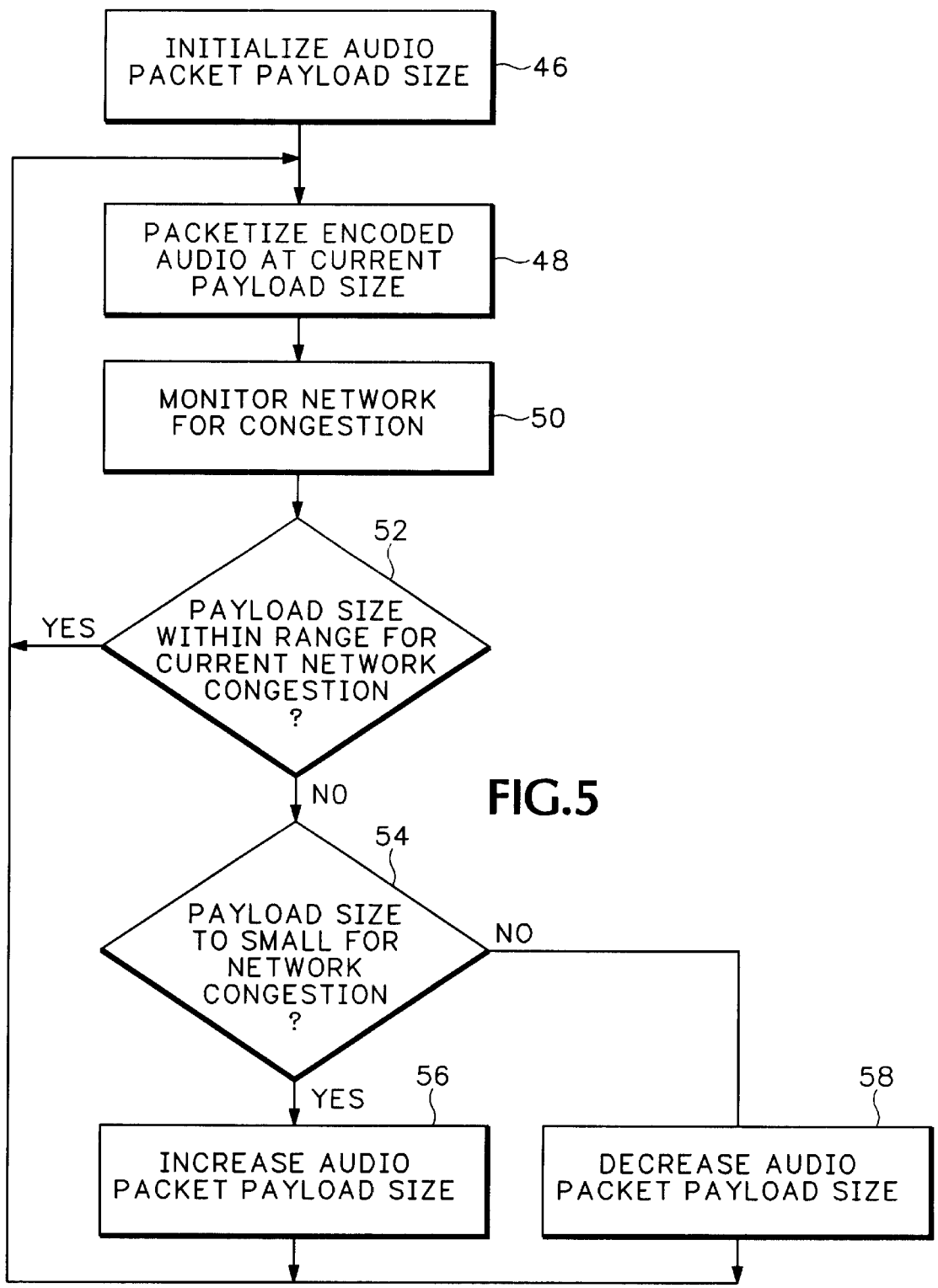
FIG. 5 is a flow diagram describing how a packetizer in the transmitting gateway shown in FIG. 2 operates.

It should be noted that the amount of audio data in each packet is varied independently of the audio encoder 22 (FIG. 22). Thus, the encoding scheme used to encode and decode the audio data does not have to be changed for different packet network conditions. This reduces encoder complexity. Because the size of audio packets and audio packet payloads is relayed in the packet header information, no modifications have to be made to existing network transport protocols. There are several well known algorithms for performing real-time adaptation that can be applied here. FIG. 5 demonstrates one, but the central idea of this invention does not rely on any specific adaptation algorithm.

FIG. 5 is a flow diagram showing in more detail how the packetizer 24 in FIG. 2 operates. The packetizer 22 is initialized for a given packet payload size in step 46. The packetizer 24 in step 48 packetizes encoded data from voice encoder 22 at the selected packet payload size. While packets are output by transmitter 26, the packetizer 24 in step 50 monitors the packet network 16 for congestion. Decision step 52 determines whether the current packet payload size is within a range compatible with the current network congestion condition. This is can be done using a table previously loaded into the packetizer 24. The table contains acceptable packet payload sizes for different end-to-end network delays.

If the payload size is within range, the packetizer 24 jumps back to step 48 and continues to packetize audio data at the current payload size. If the current payload size is not within an acceptable range for the current network congestion, decision step 54 determines whether the current packet payload is either too small or too large.

Decision step 54 decides whether the packet payload size is too small for the current end-to-end delay. If so, the packetizer 24 automatically increases the audio packet payload size in step 56. If the packet payload is too large, the audio packet payload size is automatically decreased by the packetizer 24 in step 58. The packetizer then jumps back to step 48 and packetizes audio data at the new packet payload size.

Figure 6:
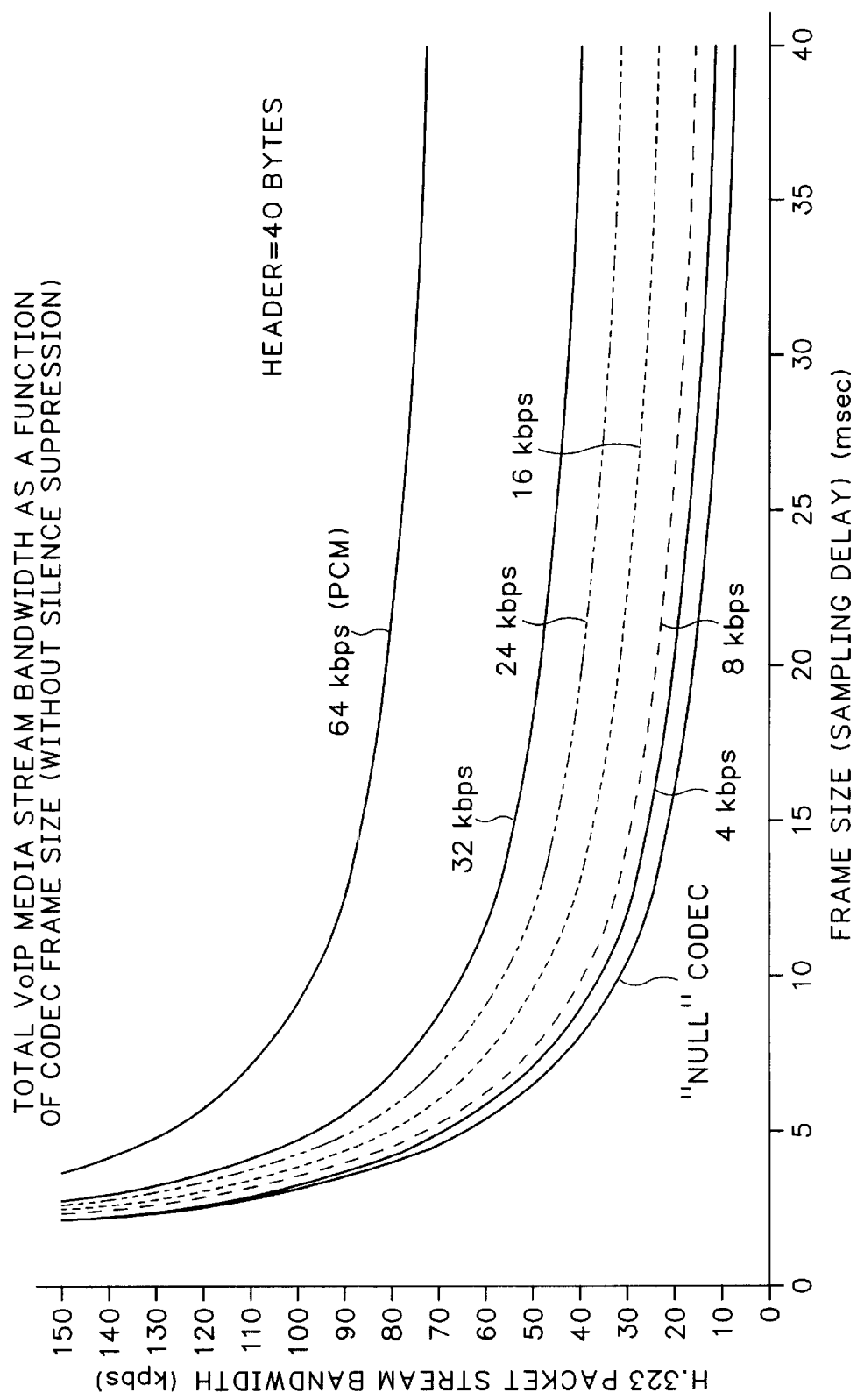
FIG. 6 is a graph showing network bandwidth consumption for different header to payload ratios.

FIG. 6 is a graph showing bandwidth consumption in a packet network for different header to payload ratios. Each line represents a different codec bit rates. This graph can be used as a reference in packetizer 24 for changing the packet payload size.

The invention dynamically changes the overhead to packet payload ratio to more effectively adapt to current network congestion conditions. By improving network bandwidth efficiency, the quality of streaming and real-time data transmitted over the packet network is improved.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A system for transmitting packets over a packet network, comprising:

a packetizer converting an encoded data stream into audio packets each having a packet header and a packet payload containing a variable amount of audio data, the packetizer monitoring an amount of end-to-end packet delay of the packets in the packet network, the end-to-end delay measured from a transmitting endpoint to a receiving endpoint and the packetizer dynamically varying the size of the packet payload in the packets containing the variable amount of audio data according to the amount of monitored end to end delay from the same variable sized audio packets transmitted over the packet network, the packetizer continuously remonitoring the end-to-end packet delay for the packets after the payload size has been varied and dynamically readjusting the packet payload size in said packets according to the amount of monitored end-to-end delay in the packets after the payload size has been varied, thus dynamically trading off packetization delay for network efficiency during the call.

2. A system according to claim 1 wherein the packetizer dynamically varies the size of the packet payload without varying any encoding scheme used by any encoder or decoder used to encode or decode the encoded data stream.

3. A system according to claim 1 wherein the end-to-end delay is provided to the packetizer using a RTCP report.

4. A system according to claim 1 wherein the packet header remains at the same size regardless of the amount of congestion in the packet network.

5. A system according to claim 1 wherein the data stream comprises an audio stream encoded by an encoder and more encoded audio data is packed into each packet payload by the packetizer independently of the encoder when there is more congestion in the packet network and less encoded audio data is packed into each packet payload by the packetizer independently of the encoder when there is less congestion in the packet network.

6. A system according to claim 5 wherein the packet header includes an IP header, an UDP header and a RTP header.

7. A system according to claim 5 wherein the encoder is coupled to a telephone that generates the audio stream.

8. A method for transmitting data over a packet network, comprising:

converting encoded data into packets having packet headers and packet audio payloads currently being encoded by a voice encoder at a first selected packet size;

transmitting the packets with the audio payloads over the packet network to a receiving endpoint while detecting congestion by monitoring an end-to-end packet delay of the packets containing the audio payloads that have been transmitted over the packet network and encoded by the voice encoder at the first selected packet size;

automatically increasing a size of additional audio packet payloads in the transmitted packets encoded by the voice encoder to a second selected packet size to reduce a percentage of the transmitted packets used as packet overhead when the end-to-end delay of the packets containing the audio payloads currently being encoded by the voice encoder at the first selected packet size indicate congestion;

automatically varying the size of the audio packet payloads according to the end-to-end delay of the packets containing the audio payloads encoded at the second selected packet size; and continuously remonitoring the end-to-end packet delay for the packets after the payload size has been varied and dynamically readjusting the size of the varied packet payload in said packets according to the amount of monitored end-to-end delay in the packets after the payload size has been varied.

9. A method according to claim 8 wherein the size of the packet payload is dynamically varied independently of any encoding or decoding scheme used to encode or decode the encoded data.

10. A method according to claim 9 wherein the end-to-end delay is measured using a RTP.

11. A method according to claim 8 wherein the data stream is an audio data stream generated from a telephone and the encoded audio data is packetized into audio packets having an audio header and an audio payload.

12. A method according to claim 11 including increasing the audio payload by delaying the transmission of each packet to encode and pack a larger amount of audio data into the packets and decreasing the amount of audio payload in the packets when the packet network is no longer congested.

13. A method according to claim 12 including using at least 40 bytes for the audio header and at least 20 bytes for the audio payload in each packet when there is little or no network congestion and using at least 40 bytes for the packet header and 40 or more bytes for the audio payload when there is greater congestion in the packet network.

14. A system for transmitting audio packets over a packet network, comprising:

a transmitting gateway having an encoder coupled to a telephone for encoding an audio stream into speech frames, a packetizer coupled to the encoder formatting the speech frames into audio packets each having packet headers and variable sized audio packet payloads including one or more of the speech frames, and a transmitter coupled between the packetizer and the packet network for transmitting the audio packets over the packet network; and a receiving gateway having a depacketizer for depacketizing the audio packet payloads into speech frames, a jitter buffer delaying decoding of the speech frames to account for variances in audio packet delays and a voice decoder for decoding the speech frames back into a decoded audio stream, the packetizer in the transmitting gateway dynamically varying the number of speech frames in the audio packet payloads according to received end-to-end audio packet transmission delays of the transmitted variable sized audio packets containing the speech frames previously generated by the packetizer in the packet network between the transmitting gateway and the receiving gateway and continuously remonitoring the end-to-end packet delay for the packets with the varied number of speech frames and dynamically readjusting the number of speech frames in the audio packet payload for the packets according to the amount of monitored end-to-end delay in the packets with the varied number of speech frames.

15. An electronic storage medium containing software for transmitting data over a packet network, comprising:

code for converting encoded data into packets having packet headers and packet payloads containing variable sized voice data payloads;

code for transmitting the packets over the packet network in a call to a receiving endpoint while detecting congestion by monitoring an end-to-end packet delay of the packets transmitted and received containing the variable sized voice data payloads in the packet network;

code for automatically increasing a size of the packet payloads in the transmitted packets to reduce a percentage of the transmitted packets used as packet overhead when the end-to-end delay of the packets containing the variable sized voice data payloads indicate congestion; and code for continuously remonitoring the end-to-end packet delay for the packets after the payload size has been varied and dynamically readjusting the packet payload size according to the amount of monitored end-to-end delay in the packets after the payload size has been varied.

16. An electronic storage medium according to claim 15 including code for dynamically varying the size of the packet payload independently of any encoding or decoding scheme used to encode or decode the encoded data.

17. An electronic storage medium according to claim 15 including code that measures the end-to-end delay using RTP.

18. An electronic storage medium according to claim 15 including code that encodes an audio data stream from a telephone into the encoded audio data and packetizes the encoded audio data into audio packets having an audio header and an audio payload.

19. An electronic storage medium according to claim 18 including code for increasing the audio payload by delaying the transmission of each packet to encode and pack a larger amount of audio data into the packets and decreasing the amount of audio payload in the packets when the packet network no longer has an end-to-end delay greater than the predetermined threshold.

20. An electronic storage medium according to claim 19 including code that uses at least 40 bytes for the audio header and at least 20 bytes for the audio payload in each packet when the end-to-end delay is less than the predetermined threshold and uses at least 40 bytes for the packet header and at least 40 bytes for the audio payload when the end-to-end delay is greater than the predetermined threshold.

21. A system for transmitting data over a packet network, comprising:

means for converting encoded data into packets having packet headers and packet payloads containing audio data;

means for transmitting the packets over the packet network to a receiving endpoint while detecting congestion by monitoring an end-to-end packet delay of the packets containing the audio data transmitted and receiving in the packet network;

means for automatically increasing a size of the packet payloads in the transmitted packets to reduce a percentage of the transmitted packets used as packet overhead when the end-to-end delay of the packets containing the audio data indicate congestion; and means for continuously remonitoring the end-to-end packet delay for the packets after the payload size has been varied and dynamically readjusting the packet payload size according to the amount of monitored end-to-end delay in the packets after the payload size has been varied.

22. A system according to claim 21 including means for dynamically varying the size of the packet payload independently of any encoding or decoding scheme used to encode or decode the encoded data.

23. A system according to claim 21 including means for measuring the end-to-end delay using a Real Time Protocol.

24. A system according to claim 21 including means for encoding an audio data stream from a telephone into the encoded audio data and packetizing the encoded audio data into audio packets having an audio header and an audio payload.

25. A system according to claim 21 including means for increasing the audio payload by delaying the transmission of each packet to encode and pack a larger amount of audio data into the packets and decreasing the amount of audio payload in the packets when the packet network no longer has an end-to-end delay greater than the predetermined threshold.

26. A system according to claim 21 including means for using at least 40 bytes for the audio header and at least 20 bytes for the audio payload in each packet when the end-to-end delay is less than the predetermined threshold and using at least 40 bytes for the packet header and at least 40 bytes for the audio payload when the end-to-end delay is greater than the predetermined threshold.

* * * * *

UNITED STATES PATENT AND TRADEMARK OFFICE
CERTIFICATE OF CORRECTION

PATENT NO. : 6,421,720 B2
DATED : July 16, 2002
INVENTOR(S) : Fitzgerald

It is certified that error appears in the above-identified patent and that said Letters Patent is hereby corrected as shown below:

Title page,
Item [56], References Cited, U.S. PATENT DOCUMENTS,
"5,506,844 - A - * - 4/1996 - Rao - 370/485" should read -- 5,506,844 - A - * - 4/1996 - Rao - 370/84 --.

Column 8,
Line 23, "and receiving in" should read -- and received in --.

Signed and Sealed this

Twentieth Day of April, 2004

JON W. DUDAS
*Acting Director of the United States Patent and Trademark Office*